Figure 1:
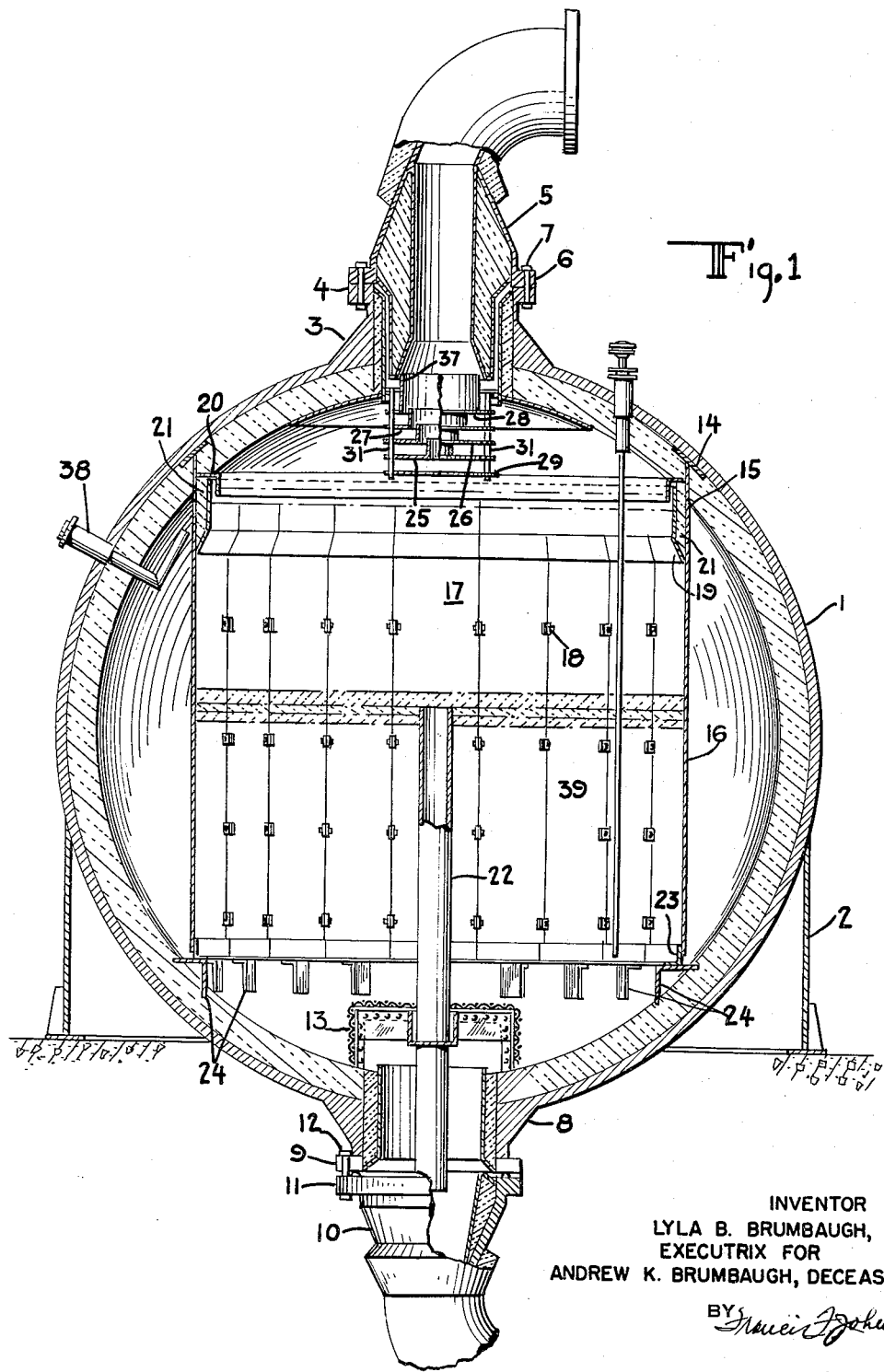

Aug. 15, 1961　　　A. K. BRUMBAUGH　　　2,996,361
MODIFIED SPHERICAL REACTOR

Filed April 2, 1958　　　　　　　　　　　　　　2 Sheets-Sheet 1

INVENTOR
LYLA B. BRUMBAUGH,
EXECUTRIX FOR
ANDREW K. BRUMBAUGH, DECEASED

BY Francis Johnston

AGENT

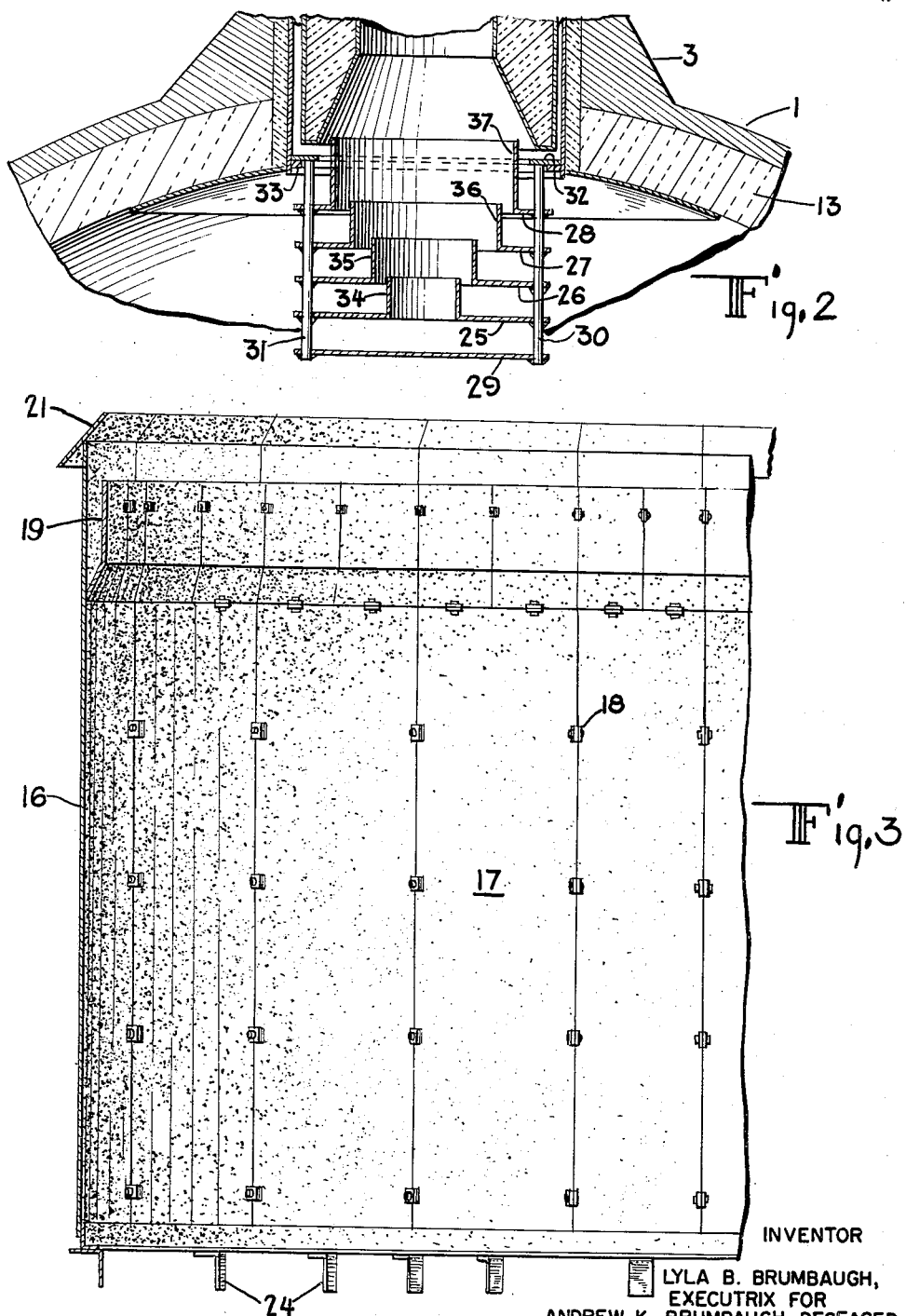

United States Patent Office 2,996,361
Patented Aug. 15, 1961

2,996,361
MODIFIED SPHERICAL REACTOR
Andrew K. Brumbaugh, deceased, late of Florham Park, N.J., by Lyla B. Brumbaugh, executrix, Florham Park, N.J., assignor to Socony Mobil Oil Company, Inc., a corporation of New York
Filed Apr. 2, 1958, Ser. No. 725,916
4 Claims. (Cl. 23—288)

The present invention relates to reactors for use in the conversion of hydrocarbons under superatmospheric pressure and, more particularly, to the modification of spherical reactors to provide efficient contact between reactant vapors and catalyst bed when the quantity of catalyst employed is only a fraction of the designed quantity of catalyst.

In the co-pending application for United States Letters Patent Serial No. 588,135 filed May 29, 1956 now U.S. Patent No. 2,884,372 in the name of Eric V. Bergstrom a spherical reactor for use in hydrocarbon conversion carried out at pressures of the order of 500 to 2000 p.s.i. at temperatures of the order of 300° to 1000° F. is disclosed and claimed. Therein it is stated that the hydrocarbon conversions which advantageously are carried out in spherical reactors are hydrogenation, reforming, desulfurization, hydrocracking and, in general, all reactions which take place at elevated temperatures and superatmospheric pressures in excess of 200 p.s.i.

Spherical reactors are especially useful in the reforming of naphtha wherein three reactors each contain substantially the same amount of reforming catalyst. Thus, for a unit designed to reform 20,000 barrels of naphtha per day at a space velocity of 2.2 v./hr./v. the total catalyst charge of 43.13 tons in a three reactor system is distributed in beds having the depths indicated in the following table.

Table I

Feed: 20,000 barrels of naphtha per day—Refinery A
Space Velocity: 2.2 v./hr./v.

|  | Tons of Catalyst | Depth of Bed in Feet |
|---|---|---|
| Reactor 1 | 14.43 | 8'-0" |
| Reactor 2 | 14.34 | 8'-0" |
| Reactor 3 | 14.36 | 8'-0" |
| Total | 43.13 |  |

Similarly, for a unit designed to reform 9000 barrels of naphtha per day at a space velocity of about 2.0 v./hr./v. the total charge of catalyst evenly distributed among the three spherical reactors is 22.68 tons distributed in beds having the depths indicated in Table II.

Table II

Feed: 9000 barrels of naphtha per day—Refinery B

|  | Tons of Catalyst | Depth of Bed in Feet |
|---|---|---|
| Reactor 1 | 7.56 | 5'-7" |
| Reactor 2 | 7.56 | 5'-7" |
| Reactor 3 | 7.56 | 5'-7" |

As disclosed in co-pending application for U.S. Letters Patent Serial No. 682,361 filed September 6, 1957 now U.S. Patent 2,946,737 in the name of Anthony E. Potas an increased yield of gasoline having an octane rating (Research +3 cc. TEL) of 100 or more is obtained when reforming naphtha in two or more adiabatic reactors through which the naphtha passes serially with reheating of the effluent of each reactor before introducing the reactor effluent into the succeeding reactor in the series when the amount of catalyst (platinum-type) in the first reactor of the series is the minimum required to produce a maximum difference between the vapor inlet temperature of the feed to said first reactor and the vapor outlet temperature of said first reactor. As stated otherwise in the aforesaid co-pending application Serial No. 682,361, an increase in yield of industrially important magnitude of gasoline having an octane rating (Research +3 cc. TEL) of 100 or more is obtained when a naphthene-containing naphtha is not contacted with platinum-type catalysts at temperatures below the autogenous quench point (as defined in said U.S. Patent No. 2,946,737).

As disclosed in the aforesaid U.S. Patent No. 2,946,737 the increased yield of gasoline, having an octane rating (Research +3 cc. TEL) of 100 or more is obtained when the naphtha to be reformed is contacted with about 2 to 5 tons, preferably 3 to 4 tons, of platinum-type catalyst in the first of a series of two or more adiabatic reactors and with a total of about 22 to 55, preferably about 33 to 44 tons of platinum-type catalyst per 10,000 barrels of naphtha reformed per stream day at an overall space velocity of about 1.0 to about 2.3 v./hr./v. Therefore, in order to obtain the advantageous increase in yield of gasoline having an octane rating (Research +3 cc. TEL) in the units for which the catalyst distributions are given in Tables I and II it is necessary to reduce the amount of catalyst in the first adiabatic reactor to about 2 to 5 tons, preferably about 3 to 4 tons, e.g., 3.5 tons of catalyst per 10,000 barrels of naphtha charged per stream day. That amount of catalyst will form in spherical reactor beds having the depths shown in Table II for the first reactors of the series.

Table III

|  | Refinery A | Refinery B |
|---|---|---|
| Catalyst Fill Reactor 1 at rate of 3.5 tons/ 10,000 barrels | 7.0 | 3.15 |
| Catalyst Bed Depth at rate of 3.5 tons/ 10,000 barrels | 3'-6" | 2'-4" |

However, in a reactor designed to contain 14.5 tons or 7.6 tons of catalyst which actually only contains 7.0 or 3.15 tons respectively the unoccupied space has a detrimental effect upon the quality of the gasoline produced because of the thermal conversion which occurs in the plenum produced by the removal of catalyst.

The aforesaid thermal effects can be reduced to an acceptable minimum or eliminated by substituting inert material such as pellets or pieces of alumina for the catalyst removed. However, the inert material substituted for the removed catalyst increases the load on the supporting structure to such an extent as to make the reactor unsafe. Thus, the load upon the supporting structure for a spherical reactor containing 14.5 tons of the aforesaid platinum-type catalyst is about 55 tons whereas the load upon the supporting structure when the same reactor contains 3.5 tons of the aforesaid platinum-type catalyst per 10,000 barrels per day naphtha and the amount of alumina pellets required to replace the 7.5 tons of catalyst removed is about 69.3 tons.

Thus, it becomes necessary to modify the first spherical reactor to permit the use of the reduced amount of catalyst required to provide the increased yield of gasoline having an octane rating (Research +3 cc. TEL) of 100 or more while providing a catalyst bed having a practical depth at a cost which is attractive without exceeding the safe limits of the existing supporting structure. Such a modified spherical reactor is illustrated in the drawings in which FIGURE 1 is a vertical cross-section of a spherical reactor modified to be used with less than the designed capacity of catalyst without unsafely overloading the reactor supports, without substantial increase of thermal conversions while providing a catalyst bed having the required depth to provide the pressure drop required for good flow distribution.

FIGURE 2 is a cross-section of the reactor inlet showing the novel suspension of the vapor distributor; and FIGURE 3 is an elevation of the catalyst chamber curtain showing the bottom sealing joint and the method of suspending the curtain from the wall of the reactor in the region of the vapor inlet, hereinafter designated the reactor roof.

As shown in FIGURE 1 the spherical reactor comprises a metallic shell 1 of minimum thickness to withstand internal pressures of 200 p.s.i. and more. The spherical reactor is supported in any suitable manner as by a skirt 2. The reactor is provided with a manway 3 which serves not only as means for inspecting the interior thereof but also as a vapor inlet. Manway 3 is provided with a flange 4. A reducer 5 provided with flange 6 complementary with flange 4 is attached to the reactor by any suitable means as for example bolts 7. The reactor is also provided with a vapor outlet and catalyst discharge conduit 8 having flange 9 to which is attached in any suitable manner a reducer 10 having flange 11 complementary of flange 9. Reducer 10 is attached to outlet 8 in any suitable manner as by means of bolts 12. Manway 3 and outlet 8 preferably are concentric with the vertical diameter of the spherical reactor.

The spherical reactor is provided with a solids-vapor separator 13 of any suitable design. Since the solids-vapor separator is not a part of the present invention detailed discussion thereof is not necessary. It will suffice to state that it comprises a spider or grid of angles supporting a screen mounted on the inner side of the reactor shell concentric with outlet 8. The grid or spider is constructed and arranged to support catalyst discharge conduit 22 in a fixed position.

Catalyst discharge conduit 22 preferably is filled to about the level of the top of the catalyst bed with fragments of inert material which flow relatively freely. Preferably, discharge conduit 22 is filled with substantially spherical pellets of inert material such as alumina about 0.5 inch in diameter.

Attached to the metallic shell in any suitable manner as by welding is plate 14 frustoconical in shape. A ring 15 is attached to plate 14 in any suitable manner as by welding. Catalyst chamber curtain 16 preferably is corrosion-resistant high temperature alloy such as 18–8 chromium-nickel steel. Preferably the catalyst chamber curtain is butt welded to the ring 15.

As is more readily recognized in FIGURE 3 the catalyst chamber curtain 16 comprises a plurality of sections 17 the vertical edges of which are beveled so that when joined together from the catalyst side of the seam the joint between each adjoining sections or panels 17 is a V-shaped groove. Each section is provided along the vertical edges of the shell side with a plurality of clamps 18 for fabrication in situ. The sections are held together by bolts running through juxtaposed clamps 18 while the sections are welded together from the catalyst or inner side.

Welded to ring 15 is a ring 19 which in the lower portion is of frusto-conical shape and in the upper portion is cylindrical in shape. At the level of the upper edge of ring 19 a plurality of L-shaped ring retaining clips 20 are welded to ring 15 so that the long leg of the clip extends over the top of ring 19 while the short leg of the ring retaining clip extends downwardly on the catalyst or inner side of the catalyst chamber curtain. The space between ring 15 and ring 19 is filled with insulating material 21, e.g., insulating cement. The catalyst chamber curtain makes a sliding, catalyst-tight joint with angle ring 23. Angle ring 23 is rigidly mounted on a plurality of ring support angles 24 in any suitable manner as by bolts (not shown). Ring support angles 24 are rigidly mounted on the reactor shell in any suitable manner as by welding. In this assembly the catalyst chamber curtain is suspended from the roof of the reactor while space for expansion of the curtain is provided by the sliding joint between the curtain and the angle ring.

The vapor distributor comprises a plurality of annuli, e.g., 3 or more, and a plate mounted on a plurality of suspending means such as rods which in turn are mounted and suspended from an annulus movably mounted on a shoulder extending inwardly from the periphery of manway 3 in the region of the catalyst chamber end of the manway. Thus, as illustrated, the vapor distributor comprises annuli 25, 26, 27 and 28, and plate 29. Each annuli is provided with a collar 34, 35, 36 and 37. Annuli 25, 26, 27 and 28 are mounted on a plurality of rods, two of which, 30 and 31 are shown, at distances dependent upon the height of collars 34, 35, 36 and 37. Annuli 25, 26, 27 and 28, and plate 29 have outside diameters substantially equal to the inside diameter of manway 3. The collar 37 has a height sufficiently greater than the distance between annulus 28 and the lower or catalyst chamber end of manway 3 that the upper edge of collar 37 is within manway 3. Collar 37 has a diameter about 70 to about 80 percent of the inside diameter of manway 3. Collar 36 has an inside diameter of about 70 to about 80 percent of the diameter of collar 37. Collar 35 has an inside diameter about 65 to about 75 percent of the diameter of collar 36. Collar 34 has an inside diameter about 45 to about 55 percent of the diameter of collar 35. Thus, about 49 to about 65 percent, say about 52 percent preferably, of the vapors passing through manway 3 pass through collar 37 and the balance flows around collar 37 to be deflected in a horizontal path by annulus 28. About 49 to about 65, preferably about 52 percent of the vapors passing through collar 37 pass through collar 36. About 42 to about 30, preferably about 36 percent of the vapors passing through collar 35 pass through collar 34. Each collar has a height about 20 to 30 percent greater than the distance between the associated annulus and the lower edge of manway 3 or the adjacent higher annulus. For example, the distance between annuli and between annulus 28 and the lower end of manway 3 can be 3.25 inches and the height of the collars 4 inches. The collars are secured to the annuli or fixed in position in any suitable manner. Thus, the collars and annuli can be fabricated as single shapes or the collars can be welded to the associated annuli. Any other construction form can be used which will ensure that the collars are centered on the annuli and in addition ensures that the vapors issuing from manway 3 will be divided into horizontal streams and vertical streams as provided by the collars and annuli described hereinbefore.

The spherical reactor is provided with means to purge the space between the shell insulation and the catalyst chamber curtain. Preferably, the reactor is provided with a plurality of purge connections 38 comprising a pipe of suitable diameter, e.g., one inch, and a suitable closure means, e.g., a valve (not shown).

The spherical reactor is also provided with one or more, preferably 3, thermocouple wells, of conventional structure extending to the region of the bottom of the catalyst bed.

It is to be observed that the load upon the supports of a spherical reactor designed for a catalyst charge of about 14.5 tons and about 3.9 tons of inert material is about 55.0 tons, when this spherical reactor is modified in accordance with the present invention for a catalyst charge of about 7 tons and about 13 tons of inert material the load on the supports is about 56 tons providing a satisfactory factor of safety.

The foregoing description of the application of the principles of the present invention makes it manifest that the present invention provides a method for converting a spherical reactor having a catalyst zone defined as a spherical segment of two bases having a given catalyst capacity to a spherical reactor having a cylindrical catalyst zone having a capacity not more than about fifty percent of said given capacity and a catalyst depth of at least 10 percent of the diameter of said reactor without loading the reactor supporting structure to unsafe limits and whilst loading that portion of the catalyst zone unoccupied by catalyst with inert material to ameliorate or substantially eliminate the effects of thermal conversion wherein the corrosion resistant lining is removed, a cylindrical catalyst chamber curtain is welded to the supporting cone, a curtain angle ring is welded to the catalyst chamber curtain in the neighborhood of the lower edge of said curtain and a complementary angle ring is welded to the reactor shell in a position to provide a sliding joint with said curtain angle ring. It will also be understood by those skilled in the art that the present invention provides a spherical reactor having a cylindrical catalyst chamber comprising a spherical reactor having an upper and lower manway concentric with the vertical diameter of said spherical reactor, a vapor inlet movably mounted in a gas-tight manner on said upper manway, a vapor outlet movably mounted in a gas-tight manner on said lower manway, a conical plate mounted on the inner side of said shell, an annulus mounted on said conical plate and extending downwardly therefrom, a cylindrical catalyst chamber curtain mounted on said annulus, a curtain angle ring mounted on said curtain in the lower region thereof, a shell angle ring mounted on said shell constructed and arranged to provide a sliding joint with said curtain angle ring, means to introduce vapors into the region of said spherical reactor above said curtain as a plurality of streams flowing substantially vertical to the periphery of said curtain, catalyst dumping means comprising a cylindrical conduit extending from the bottom of the catalyst zone to within said lower manway and substantially concentric with the vertical diameter of said reactor, and means for purging the void between said curtain and said shell with inert fluid.

I claim:

1. The method for converting a spherical reactor having a catalyst zone defined as a spherical segment of two bases having a given catalyst capacity to a spherical reactor having a cylindrical catalyst zone having a capacity not more than about 50 percent of said given capacity and a catalyst bed depth of at least 10 percent of the diameter of said reactor without loading the reactor supporting structure to unsafe limits and whilst loading that portion of the catalyst zone unoccupied by catalyst with inert material to reduce the effects of thermal conversion which comprises removing the corrosion resistant lining of a spherical reactor, rigidly mounting a cylindrical catalyst chamber curtain on the supporting cone from which said corrosion resistant liner had been suspended in a gas-tight manner, said cylindrical catalyst curtain having a diameter only a fraction of the diameter of the aforesaid spherical reactor, mounting a curtain angle ring on said curtain in a gas-tight manner in the lower region of said curtain, and mounting a shell angle ring on the inner side of the shell of said reactor to provide a sliding joint with said curtain ring.

2. In a spherical reactor having a catalyst zone defined as a spherical segment of two bases and having a given catalyst capacity, having an upper and a lower manway substantially concentric with the vertical diameter of said spherical reactor, a vapor inlet movably mounted in a gas-tight manner on said upper manway, a vapor outlet movably mounted in a gas-tight manner on said lower manway, means to introduce vapors into said reactor movably suspended from said upper manway, said means to introduce vapors being constructed and aranged to produce a plurality of streams of vapors flowing substantially vertically to the aforesaid vertical diameter of said reactor, tubular means concentric with the vertical axis of said spherical reactor extending from the plane of the bottom of a catalyst zone within said spherical reactor into said lower manway adapted for dumping particle-form catalyst, a conical plate mounted on the inner periphery of said reactor in the upper portion thereof, and an annulus substantially concentric with the vertical diameter of said spherical reactor mounted on said conical plate, the combination whereby the aforesaid catalyst zone defined as a spherical segment of two bases and having a given catalyst capacity is converted to a cylindrical catalyst chamber having a catalyst capacity not more than about fifty percent of the catalyst capacity of the aforesaid catalyst zone defined as a spherical segment of two bases and a catalyst depth at least ten percent of the diameter of said spherical reactor without exceeding the safe loading limits of the supporting structure while providing a catalyst zone of practical depth which comprises a cylindrical catalyst chamber curtain rigidly mounted in a gas-tight manner on said annulus in the lower portion thereof, said cylindrical catalyst chamber curtain having a diameter only a fraction of the diameter of the aforesaid spherical reactor, and a shell angle ring rigidly mounted on the inner periphery of said reactor in the lower portion thereof and disposed to form a sliding joint with the lower portion of said cylindrical catalyst chamber curtain.

3. In a spherical reactor having an upper and a lower manway substantially concentric with the vertical diameter of said spherical reactor, a vapor inlet movably mounted in a gas-tight manner on said upper manway, a vapor outlet movably mounted in a gas-tight manner on said lower manway, means to introduce vapors into said reactor movably suspended from said upper manway, said means to introduce vapors being constructed and arranged to produce a plurality of streams of vapors flowing substantially at right angles to the aforesaid vertical diameter of said spherical reactor, tubular means concentric with the vertical axis of said spherical reactor extending from the plane of the bottom of a catalyst zone within said spherical reactor into said lower manway adapted for dumping particle-form catalyst, a conical plate mounted on the inner periphery of said reactor in the upper portion thereof, and an annulus mounted on said conical plate, the combination comprising a cylindrical catalyst chamber having a diameter only a fraction of the diameter of said spherical reactor, said cylindrical catalyst chamber comprising a cylindrical catalyst chamber curtain rigidly mounted in a gas-tight manner on said conical plate in the lower portion thereof, said cylindrical catalyst chamber curtain having a diameter only a fraction of the diameter of said spherical reactor, and a shell angle iron mounted on the inner periphery of said shell in the lower portion thereof and disposed to form a sliding joint with the lower portion of said cylindrical catalyst chamber curtain.

4. In the spherical reactor having a cylindrical catalyst chamber curtain as set forth and described in claim 3, means to introduce inert gas into the space between the shell of said spherical reactor and said cylindrical catalyst chamber curtain below the plane at which said cylindrical catalyst chamber curtain is mounted on said conical plate and above the plane of said shell angle iron.

References Cited in the file of this patent

UNITED STATES PATENTS

| 2,548,519 | Cummings | Apr. 10, 1951 |
| 2,833,631 | Rossheim | May 6, 1958 |

FOREIGN PATENTS

| 128,900 | Sweden | Aug. 1, 1950 |
| 425,348 | Italy | Sept. 24, 1947 |